United States Patent
Lin et al.

(10) Patent No.: US 12,297,366 B2
(45) Date of Patent: May 13, 2025

(54) QUANTUM DOT OIL-BASED INK AND PATTERN RECOGNITION SYSTEM

(71) Applicant: Lextar Electronics Corporation, Hsinchu (TW)

(72) Inventors: Chun Che Lin, Hsinchu (TW); Chong-Ci Hu, Hsinchu (TW); Yi-Ting Tsai, Hsinchu (TW); Ching-Yi Chen, Hsinchu (TW); Yu-Chun Lee, Hsinchu (TW)

(73) Assignee: LEXTAR ELECTRONICS CORPORATION, Hsinchu (TW)

( * ) Notice: Subject to any disclaimer, the term of this patent is extended or adjusted under 35 U.S.C. 154(b) by 238 days.

(21) Appl. No.: 18/059,494

(22) Filed: Nov. 29, 2022

(65) Prior Publication Data
US 2024/0101847 A1    Mar. 28, 2024

(30) Foreign Application Priority Data
Sep. 28, 2022  (TW) .................................. 111136661

(51) Int. Cl.
*C09D 11/037*    (2014.01)
*C09D 11/033*    (2014.01)
(Continued)

(52) U.S. Cl.
CPC ............ *C09D 11/50* (2013.01); *C09D 11/033* (2013.01); *C09D 11/037* (2013.01);
(Continued)

(58) Field of Classification Search
CPC ..... C09D 11/50; C09D 11/033; C09D 11/037; C09D 11/108; C09D 11/322; C09D 11/36;
(Continued)

(56) References Cited

U.S. PATENT DOCUMENTS

2010/0052512 A1*  3/2010  Clough ............... C09K 11/02
                                                     252/512
2011/0227007 A1*  9/2011  Kang ................ H01L 21/02601
                                                     252/519.51
(Continued)

FOREIGN PATENT DOCUMENTS

CN        105694590 A      6/2016
CN        108727904 A      11/2018
(Continued)

OTHER PUBLICATIONS

Chinese language office action dated May 4, 2023, issued in application No. TW 111136661.

*Primary Examiner* — Dani Fox
*Assistant Examiner* — Mamadou Faye
(74) *Attorney, Agent, or Firm* — McClure, Qualey & Rodack, LLP

(57) ABSTRACT

A quantum dot oil-based ink is provided. The quantum dot oil-based ink includes a quantum dot material, a dispersing solvent, a viscosity modifier, and a surface tension modifying solution. The dispersing solvent includes a linear alkane having 6 to 14 carbon atoms. The viscosity modifier includes an aromatic hydrocarbon having 10 to 18 carbon atoms or a linear olefin having 16 to 20 carbon atoms. The surface tension modifying solution includes a hydrophobic polymer material and a nonpolar solvent.

16 Claims, 4 Drawing Sheets

(51) Int. Cl.
     *C09D 11/108*     (2014.01)
     *C09D 11/322*     (2014.01)
     *C09D 11/36*     (2014.01)
     *C09D 11/38*     (2014.01)
     *C09D 11/50*     (2014.01)
     *C09K 11/66*     (2006.01)
     *B82Y 20/00*     (2011.01)
     *B82Y 40/00*     (2011.01)

(52) U.S. Cl.
     CPC .......... *C09D 11/108* (2013.01); *C09D 11/322* (2013.01); *C09D 11/36* (2013.01); *C09D 11/38* (2013.01); *C09K 11/661* (2013.01); *B82Y 20/00* (2013.01); *B82Y 40/00* (2013.01)

(58) Field of Classification Search
     CPC ....... C09D 11/38; C09D 11/10; C09K 11/661; B82Y 20/00; B82Y 40/00
     See application file for complete search history.

(56) References Cited

U.S. PATENT DOCUMENTS

2015/0075397 A1*   3/2015   Gresty ................... C09D 11/12
                                                          524/548
2018/0029072 A1*   2/2018   Li ........................... G02B 1/10

FOREIGN PATENT DOCUMENTS

| CN | 113122054 A | 7/2021 |
|---|---|---|
| CN | 113845916 A | 12/2021 |

* cited by examiner

| Polyethylene (weight%) | | | | |
|---|---|---|---|---|
| 0.025 | 0.05 | 0.075 | 0.1 | 0.125 |
| NTUT APCL | NTUT APCL | NTUT APCL | NTUT APCL | NTUT APCL |

FIG. 2C

QUANTUM DOT OIL-BASED INK AND PATTERN RECOGNITION SYSTEM

CROSS REFERENCE TO RELATED APPLICATIONS

This application claims priority of Taiwan Patent Application No. 111136661, filed on Sep. 28, 2022, the entirety of which is incorporated by reference herein.

BACKGROUND

Technical Field

The disclosure relates to a quantum dot oil-based ink and a pattern recognition system, and, in particular, to a quantum dot oil-based ink capable of generating near infrared light.

Description of the Related Art

Recently, the counterfeiting and reverse engineering of banknotes, passports, certificates and confidential documents has become increasingly rampant. In order to avoid forgery, special processes are performed on the items, for example, coating the items with specific patterns using special printing methods, especially using printed patterns that are difficult to be reproduced or printed, or using printed patterns that are difficult to be recognized with the naked eye in the visible range, in order to make them more difficult to be counterfeited.

Although many anti-counterfeiting oil-based inks that use stimulating color change technologies (e.g., photo-, hydro- or thermochromic systems) with high security and quick verification have been developed, these oil-based inks are not satisfactory in all respects.

SUMMARY

A quantum dot oil-based ink is provided according to some embodiments of the disclosure. The quantum dot oil-based ink includes a quantum dot material, a dispersing solvent, a viscosity modifier, and a surface tension modifying solution. The dispersing solvent includes a linear alkane having 6 to 14 carbon atoms and is configured to disperse the quantum dot material in the quantum dot oil-based ink. The viscosity modifier includes an aromatic hydrocarbon having 10 to 18 carbon atoms or a linear olefin having 16 to 20 carbon atoms. The viscosity of the quantum dot oil-based ink is controlled by adjusting a volume ratio of the dispersing solvent to the viscosity modifier. The surface tension modifying solution includes a hydrophobic polymer material and a nonpolar solvent, and is configured to adjust a surface tension of the quantum dot oil-based ink.

A pattern recognition system is provided according to some embodiments of the disclosure. The pattern recognition system includes an object to be detected, an excitation light source, and an infrared light detector. The surface of the object is coated with a pattern using the aforementioned quantum dot oil-based ink. The excitation light source is configured to irradiate the pattern on the object, and the excitation light source emits a blue light or an ultraviolet light. The infrared light detector is configured to detect an emission light generated by the pattern of the quantum dot oil-based ink, and the emission light has a wavelength within a near infrared range.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein:

FIG. 2C illustrates post ink-jet printing patterns captured by an infrared camera, in which the patterns are ink-jet printed by quantum dot oil-based ink with different amounts of polyethylene.

DETAILED DESCRIPTION OF THE DISCLOSURE

Figure 1A:
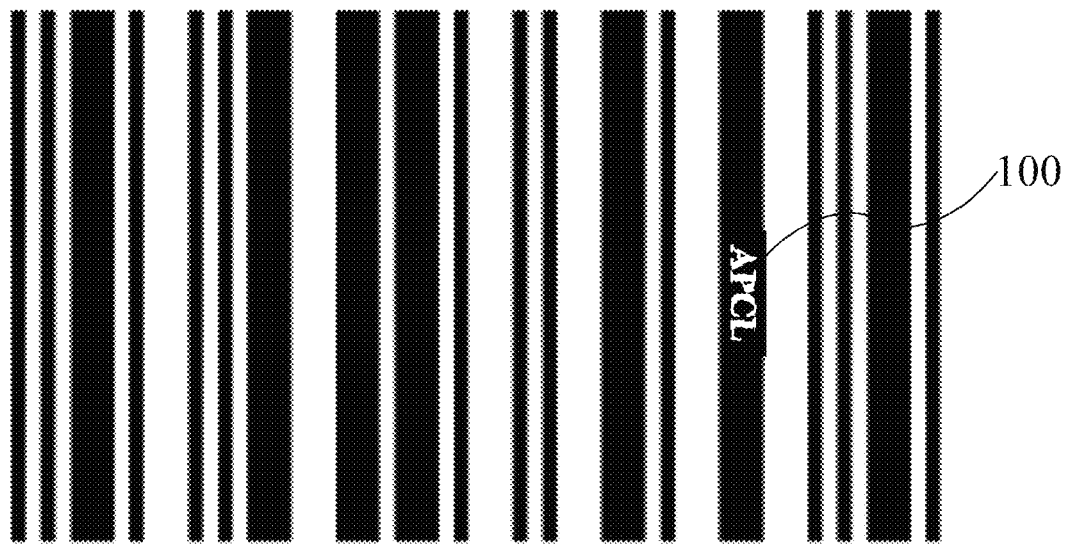
FIG. 1A illustrates a pattern to be ink-jet printed on a QR code.

The quantum dot oil-based ink and the pattern recognition system of the embodiments of the present disclosure are described in detail in the following description. For the illustrative purposes, numerous specific details and embodiments are set forth in the following description to provide a thorough understanding of the inventive concepts of the present disclosure. However, it is apparent that the exemplary embodiments described herein are merely used for illustration. The concept of the embodiments of the present disclosure can be presented in various forms and are not limited to these exemplary embodiments.

As used herein, the terms "about" and "substantially" typically mean within 10% of a given value or range, or, preferably mean within 5% of the given value or range, within 3% of the given value or range, within 2% of the given value or range, within 1% of the given value or range, or more preferably mean within 0.5% of the given value or range. The given value herein is an approximate value, that is, when there is no specific description of "about" or "substantially", the given value implicitly includes the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the disclosure and the background or the context of the disclosure, and should not be interpreted in an idealized or overly formal manner unless so defined.

The present disclosure provides a quantum dot oil-based ink. The quantum dot oil-based ink includes a quantum dot material. Under the excitation with a specific wavelength of light, the quantum dot material can generate near infrared light. Under the light excitation, the pattern printed by the quantum dot oil-based ink is not recognizable under the visible light, and the pattern can only be recognized by a detector (e.g., an infrared camera) capable of detecting a specific wavelength range of light, and thereby, an anti-counterfeiting effect is achieved. The quantum dot oil-based ink includes a dispersing solvent, a viscosity modifier, and a surface tension modifying solution. With a specific proportion of the dispersing solvent and the viscosity modifier, the viscosity, surface tension, and quantum dot dispersion of the quantum dot oil-based ink can be improved. Thus, these quantum dot oil-based inks may be adopted in a commercially available home printer to prevent the print head of the printer from clogging. On the other hand, the surface tension modifying solution in the quantum dot oil-based ink can alleviate the problem of oil-based ink smearing on general printing paper, and make the printed pattern clearer and easier to recognize.

According to embodiments of the present disclosure, the quantum dot oil-based ink includes a quantum dot material. Under the light excitation with blue light or ultraviolet (UV) light, the quantum dot material in the quantum dot oil-based ink may generate emission lights with the wavelength within the infrared spectral range, for example, an emission light with a wavelength between about 800 nm and 2500 nm. In an embodiment, the wavelength of the emission light generated by the excitation of the quantum dot material may be between about 900 nm and about 1700 nm, and the peak value of the emission spectrum may be about 1300 nm. In an embodiment, the blue light may be provided by a blue light-emitting diode (LED), and the UV light may be provided by a UV LED.

In some embodiments, the quantum dot material may include near infrared quantum dots. That is, the near infrared quantum dots can generate a near infrared emission light with a wavelength between about 800 nm and about 2500 nm, after being excited by blue light or UV light. In an embodiment, the quantum dot material includes oil soluble near infrared quantum dots. According to some embodiments of the present disclosure, the quantum dot material may include: CdTe, $Ag_2S$, $Ag_2Se$, InAs, InP, HgTe, PbS, PbSe, $CuInS_2$, $CuInSe_2$, CdSeTe, CdHgTe, InP/ZnS, InAs/CdSe, PbS/CdS, HgTe/CdS, CdTe/ZnS, CdTe/CdSe, ZnTe/CdTe, ZnTe/CdSe, ZnTe/CdS, CdSeTe/CdS, Cu doped CdS/ZnS, CuInS2/ZnS, $CuInSe_2$/ZnS, and so on, or combinations thereof. In an embodiment, the quantum dot material includes PbS.

According to some embodiments of the present disclosure, based on 100 weight % (wt %) of the quantum dot oil-based ink, the amount of the quantum dot material is between about 0.1 wt % and 10 wt %, such as, between about 0.5 wt % and 9.5 wt %, between about 1.0 wt % and 9.0 wt %, between about 1.5 wt % and 9.0 wt %, between about 2.0 wt % and 8.5 wt %, between about 2.5 wt % and 8.5 wt %, between about 3.0 wt % and 8.0 wt %, between about 3.5 wt % and 7.0 wt %, between about 4.0 wt % and 6.5 wt %, between about 4.5 wt % and 6.0 wt %, or between about 5.0 wt % and 5.5 wt %.

According to the embodiments of the present disclosure, the quantum dot oil-based ink further includes a dispersing solvent. The dispersing solvent may include a linear alkane having 6 to 14 carbon atoms, such as, a linear alkane having 6, 7, 8, 9, 10, 11, 12, 13, or 14 carbon atoms. In an embodiment, the dispersing solvent may include a linear alkane having 6 to 12 carbon atoms. In another embodiment, the dispersing solvent may include a linear alkane having 6 to 10 carbon atoms. In an embodiment, the dispersing solvent may be a nonpolar linear alkane to allow the quantum dot material in the quantum dot oil-based ink to be dispersed in the ink solution. For example, the nonpolar linear alkane may include: n-hexane, n-heptane, n-octane, n-nonane, n-decane, n-undecane, n-dodecane, n-tridecane, n-tetradecane, or combinations thereof.

According to some embodiments of the present disclosure, based on 100 wt % of the quantum dot oil-based ink, the amount of the dispersing solvent is between about 10 wt % and about 65 wt % of the amount of quantum dot oil-based ink.

According to the embodiments of the present disclosure, the quantum dot oil-based ink further includes a viscosity modifier. The viscosity modifier in the quantum dot oil-based ink can adjust the final viscosity of the quantum dot oil-based ink to a range suitable for a commercially available home printer that can prevent the quantum dot oil-based ink from clogging the printer head of the printer. The viscosity modifier may include an aromatic hydrocarbon having 10 to 18 carbon atoms or a linear olefin having 16 to 20 carbon atoms. For example, an aromatic hydrocarbon having 10 to 18 carbon atoms may include: phenylcyclohexane, 1-phenyldodecane, naphthane, and so on, or combinations thereof. For example, a linear olefin having 16 to 20 carbon atoms may include 1-hexadecene, 1-heptadecene, 1-octadecene, 1-nonadecene, 1-eicosene, and so on, or combinations thereof.

According to some embodiments of the present disclosure, based on 100 wt % of the quantum dot oil-based ink, the amount of the viscosity modifier is between about 35 wt % and about 90 wt % of the amount of the quantum dot oil-based ink.

In some embodiments, the viscosity of the viscosity modifier may be between about 3 mPa·s and 5 mPa·s. In detail, the desired final viscosity of the quantum dot oil-based ink can be achieved through adjusting the volume ratio of the dispersing solvent to the viscosity modifier in the quantum dot oil-based ink. Specifically, according to some embodiments, the ratio of the dispersing solvent to the viscosity modifier is between about 1:9 and about 7:3, such as, about 1:9, about 2:8, about 3:7, about 4:6, about 5:5, about 6:4, or about 7:3. If the volume ratio of the dispersing solvent to the viscosity modifier is too small (e.g., smaller than about 1:9), the quantum dot oil-based ink may be easily smeared on the paper, and thus a clear pattern cannot be obtained. If the volume ratio of the dispersing solvent to the viscosity modifier is too large (e.g., larger than about 7:3), the viscosity of the quantum dot oil-based ink may be so high that a general home printer may be blocked and the predetermined pattern may not be printed smoothly.

Furthermore, in some embodiments, as mentioned above, through adjusting the volume ratio of the dispersing solvent to the viscosity modifier in the quantum dot oil-based ink, the final viscosity of the quantum dot oil-based ink may be adjusted to between about 0.5 mPa·s and about 5 mPa·s, such as, between about 1.0 mPa·s and about 4.5 mPa·s, between about 1.5 mPa·s and about 4.0 mPa·s, between about 2.0 mPa·s and about 3.5 mPa·s, or between about 2.5 mPa·s and about 3.0 mPa·s.

According to some embodiments, the viscosity described herein can be measured by Ostwald viscometer under 24° C. In detail, the time that a certain volume of standard liquid and sample liquid flowing through a certain length interval is measured, then the viscosity of the sample liquid is estimated. In an embodiment, the final viscosity of the quantum dot oil-based ink may be between about 1 mPa·s and about 3 mPa·s under 24° C.

According to the embodiments of the present disclosure, the quantum dot oil-based ink further includes a surface tension modifying solution. The surface tension modifying solution includes a hydrophobic polymer material and a nonpolar solvent. The hydrophobic polymer material can adjust the surface tension of the quantum dot oil-based ink, to reduce the smearing phenomenon on the paper when the pattern is printed by the quantum dot oil-based ink.

According to some embodiments, the hydrophobic polymer material in the surface tension modifying solution may be a hydrophobic organic polymer material. For example, in some embodiments, the hydrophobic organic polymer material may include polyethylene, polystyrene, polypropylene, poly (methyl methacrylate) (PMMA), poly(ethylene glycol) monolaurate, polyacrylate, or combinations thereof.

In an embodiment, based on 100 wt % of the quantum dot oil-based ink, the amount of the hydrophobic polymer material is between about 0.005 wt % and about 0.5 wt % of the amount of the quantum dot oil-based ink, such as, between about 0.01 wt % and 0.45 wt %, between about 0.015 wt % and 0.4 wt %, between about 0.02 wt % and 0.35 wt %, between about 0.025 wt % and 0.3 wt %.

As described above, the surface tension modifying solution can adjust the surface tension of the quantum dot oil-based ink within a desired range to prevent the quantum dot oil-based ink from smearing the paper. The quantum dot oil-based ink can be easily absorbed by printing papers with different textures and it does not need to take too much time for the papers to completely absorb the quantum dot oil-based ink. Specifically, in some embodiments, the surface tension modifying solution can adjust the surface tension of the quantum dot oil-based ink between about 20 dyne/cm and 30 dyne/cm, such as, between about 22 dyne/cm and about 28 dyne/cm, between about 22 dyne/cm and about 26 dyne/cm, between about 22 dyne/cm and about 24 dyne/cm, or between about 20 dyne/cm and about 24 dyne/cm.

According to some embodiments, the surface tension described herein can be measured by Du Noüy ring method and a tensiometer. In detail, Du Noüy ring method uses a platinum ring in a tensiometer as a sensing interface. After immersing the platinum ring to the liquid to be tested, the platinum ring is lifted slowly until it leaves the surface of the liquid. During the lifting process for the platinum ring to leave the liquid, a liquid column is formed between the platinum ring and the liquid, and finally, the platinum ring is separated from the liquid. The maximum value of the tension before the platinum ring and the liquid are finally separated can be converted into the surface tension value (σ value) of the liquid by the following formula:

$$\sigma = \frac{F}{L \times \cos\theta},$$

wherein F is the maximum value of the tension before the platinum ring and the liquid are finally separated, L is the sum of the inner and outer perimeters of the platinum ring, and θ is the contact angle between the platinum ring and the liquid surface.

According to another embodiment of the present disclosure, the surface tension described herein may also be measured using the Wilhelmy plate method and a tensiometer. In detail, the Wilhelmy plate method uses a plate in a tensiometer as a sensing interface. The plate may be formed of filter paper, glass, or platinum, wherein its surface may be further roughened for ensuring the plate to be sufficiently wetted. Similar to Du Noüy ring method, after immersing the plate to the liquid to be tested, the plate is lifted slowly until it leaves the surface of the liquid. The maximum value of the tension before the plate and the liquid are finally separated can be converted into the surface tension value (σ value) of the liquid by the following formula:

$$\sigma = \frac{F}{L \times \cos\theta},$$

wherein F is the maximum value of the tension before the plate and the liquid are finally separated, L is the perimeter of the plate that contacts to the liquid surface, and θ is the contact angle between the plate and the liquid surface.

The nonpolar solvent in the surface tension modifying solution is used to dissolve the hydrophobic polymer material. In some embodiments, the nonpolar solvent in the surface tension modifying solution may include an aromatic hydrocarbon. For example, the aromatic hydrocarbon may be toluene, dimethylbenzene, tetrahydronaphthalene, naphthane, or combinations thereof. When the hydrophobic polymer material is provided in crystalline form, it is necessary to use a nonpolar solvent and perform a moderate heating to dissolve the hydrophobic polymer material for obtaining a surface tension modifying solution.

According to some embodiments of the present disclosure, based on 100 wt % of the quantum dot oil-based ink, the amount of the nonpolar solvent in the surface tension modifying solution is between about 5 wt % and about 10 wt %, such as, between about 5.5 wt % and about 9.5 wt %, between about 6.0 wt % and about 9.0 wt %, between about 6.5 wt % and about 8.5 wt %, or between about 7.0 wt % and about 8.0 wt %.

According to some embodiments, the volume ratio of the dispersing solvent to the nonpolar solvent is between about 8:1 and about 8:4, such as, about 8:1, about 8:2, about 8:3, or about 8:4. If the volume ratio of the dispersing solvent to the nonpolar solvent is too large (e.g., larger than about 8:1), the solubility of the hydrophobic polymer material may be worse. If the volume ratio of the dispersing solvent to the nonpolar solvent is too small (e.g., smaller than about 8:4), the viscosity of the ink may be smaller, which may easily cause the occurrence of poor ink-jet.

In an embodiment, the quantum dot oil-based ink may comprise the quantum dot material, the dispersing solvent, the viscosity modifier, and the surface tension modifying solution. In other words, based on 100 wt % of the quantum dot oil-based ink, the sum of the amount of the quantum dot material, the dispersing solvent, the viscosity modifier and the surface tension modifying solution is 100 wt %.

The present disclosure further provides a pattern recognition system. The pattern recognition system includes an object to be detected. The surface of the object is coated with a pattern having the quantum dot oil-based ink. The pattern recognition system can recognize the object to be detected. The object to be detected is not particularly limited, as long as the quantum dot oil-based ink provided by the present disclosure can be coated on its surface. For example, the object may be any daily use papers, including printing paper or kraft paper.

According to some embodiments of the present disclosure, the pattern recognition system further includes an excitation light source. The excitation light source is used to irradiate the pattern on the object to be tested. The excitation light source can emit a blue light or an UV light. In an embodiment, the excitation light source may be a blue LED for providing the blue light, or the excitation light source may be a UV LED for providing the UV light.

According to some embodiments of the present disclosure, the pattern recognition system may further include an infrared light detector, to detect an emission light generated from the quantum dot oil-based ink of the pattern on the object to be detected. Because the near infrared quantum dots in the quantum dot oil-based ink are excited to generate emission light by the blue light or UV light excitation light source and the wavelength of the emission light is within the near infrared spectral range, the infrared detector (e.g., an infrared camera) can detect the emission light of the quantum dot oil-based ink and recognize the authenticity of the pattern on the object. In detail, according to some embodiments, the emission light of the quantum dot oil-based ink can generate a near infrared light with a wavelength between about 800 nm and about 2500 nm.

The quantum dot oil-based ink provided by the present disclosure is transparent and colorless, that is, it cannot be recognized with the naked eye in the visible range (e.g., about 400 nm to about 700 nm). Moreover, even the emission light generated by the quantum dot oil-based ink through irradiating with the blue light or UV light cannot be recognized with the naked eye, since the wavelength of the emission light is within the near infrared spectral range. Thus, the infrared detector can detect the emission light generated by the quantum dot oil-based ink, thereby achieving the anti-counterfeiting recognition. On the other hand, because the quantum dot oil-based ink is transparent and colorless, it is not easy for the counterfeiter or the thief to notice that the anti-counterfeiting pattern has been printed on an item. In this way, the difficulties of the burden of proof on the prosecutors may be reduced.

For a clear and easy understanding of the abovementioned or other purposes, features, and advantages of the present disclosure, several embodiments with accompanying figures are especially listed below to illustrate the properties of the quantum dot oil-based ink produced and utilized in the present disclosure. However, the following embodiments are merely examples used for illustrating, but shall not be interpreted as limitations of implementing the contents of the present disclosure.

EXAMPLES

1. Preparation of the Quantum Dot Material

159 µL bis(trimethylsilyl)sulfide (TMS) was added to the 5 mL dehydrated 1-octadecene (ODE) to form a sulfide precursor solution. 0.361 g Lead(II) oxide, 2 mL oleic acid, and 15 mL 1-octadecene were mixed in a three-necked flask. Then, in vacuum environment, the sulfide precursor solution was quickly injected to the three-necked flask and reacted for 2 minutes. During the reaction, the color of the solution changed from dark brown to black. After the reaction, the solution was placed in an ice bath until it returned to the room temperature. Then, in air environment, the reaction solution was heated to 110° C. and kept for 1 hour to form colorless and transparent lead oleate. Subsequently, in nitrogen environment, the reaction solution was heated to 170° C., and toluene and ethanol were added to the solution with the volume ratio of the reaction solution:toluene:ethanol being 1:3:2. After mixing the reaction solution, toluene and ethanol, the mixed solution was centrifuged at 7,000 rpm for 10 minutes. After the centrifugation, a dark precipitate was formed on the bottom portion and the sidewalls of the container. The supernatant was removed and the precipitate was dried to obtain the quantum dot material.

2. Viscosity Test of the Quantum Dot Oil-Based Ink 200 mg quantum dot material produced by the Example 1 was added to 10 mL n-octane (i.e., the dispersing solvent mentioned above), and an ultrasonic vibration was performed to uniformly disperse the quantum dot material in n-octane. Then, 1-octadecene (i.e., the viscosity modifier mentioned above) with various volumes was added to the solution having the quantum dot material and dispersed thereof uniformly. However, for the purpose of comparing the difference with and without the addition of the viscosity modifiers, in some samples, 1-octadecene was not added or n-octane was completely replaced with water or 1-octadecene to test the viscosity of the quantum dot oil-based ink. In detail, in the viscosity test, the sum of the volume of the dispersing solvent and the viscosity modifier was 10 mL.

In detail, the Ostwald viscometer was used under 24° C. to measure the time of a certain volume standard liquid and the sample liquid flowing in a certain length interval to estimate the viscosity of the quantum dot oil-based ink. In detail, water was used as the standard to measure the flow time of the water standard (obtained by calculating the average value after measuring three times), followed by measuring the flow time of the sample liquid (obtained by calculating the average value after measuring three times), then, the ratio of the density and flow time of the water standard to that of the sample was calculated. In detail, the viscosity of the sample was calculated by the following formula:

$$\eta = \eta_0 \times \frac{\rho t}{\rho_0 t_0},$$

wherein η is the viscosity of the sample, $\eta_0$ is the viscosity of the standard, ρ is the density of the sample, t is the flow time of the sample, $\rho_0$ is the density of the sample, to is the flow time of the standard. The influence of the viscosity modifier on the viscosity of the quantum dot oil-based ink is shown in Table 1.

TABLE 1

| dispersing solvent and/or viscosity modifier | | density (g/cm³) | flow time (s) | viscosity (mPa · s) |
|---|---|---|---|---|
| water (standard) | | 1.028 | 121.7 | 1 |
| 1-octadecene | | 0.81 | 668.7 | 4.329 |
| n-octane | | 0.719 | 99.7 | 0.573 |
| n-octane:1-octadecene (volume ratio) | 9:1 | 0.728 | 113 | 0.658 |
| | 8:2 | 0.737 | 136.3 | 0.803 |
| | 7:3 | 0.747 | 157 | 0.937 |
| | 6:4 | 0.756 | 188 | 1.136 |
| | 5:5 | 0.765 | 231 | 1.413 |
| | 4:6 | 0.774 | 278.7 | 1.725 |
| | 3:7 | 0.783 | 338 | 2.114 |
| | 2:8 | 0.792 | 410.7 | 2.599 |
| | 1:9 | 0.8 | 490.7 | 3.139 |

As shown in Table 1, under the condition that no additional 1-octadecene (i.e., the viscosity modifier) was added, the viscosity of the quantum dot oil-based ink was the lowest. As more 1-octadecene were added to the quantum dot oil-based ink, the viscosity of the quantum dot oil-based ink was gradually increased. If n-octane was completely replaced with 1-octadecene, the viscosity of the quantum dot oil-based ink was the highest. The results of the viscosity test showed that addition of the viscosity modifier can control the viscosity of the quantum dot oil-based ink within a desired range.

Figure 1B:
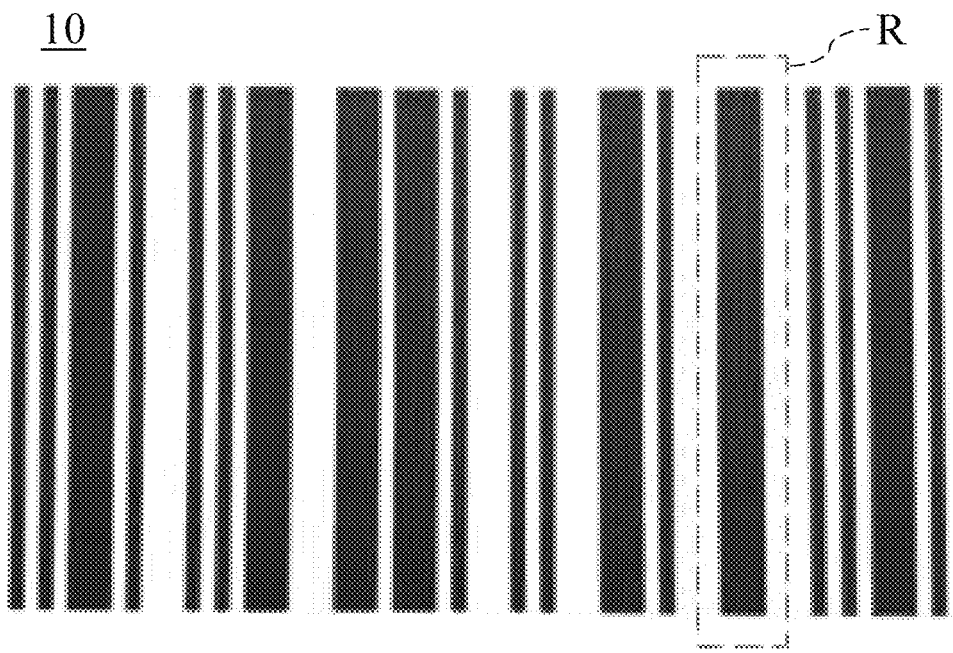
FIG. 1B illustrates a diagrammatic view of the QR code under visible light after ink-jet printing.

3. Influence of the Viscosity of the Quantum Dot Oil-Based Ink on the Printing Effect of the Pattern Referring to FIGS. 1A and 1B, FIG. 1A illustrates a pattern 100 to be ink-jet printed on a QR code 10, and FIG. 1B illustrates a diagrammatic view of the QR code 10 under visible light after ink-jet printing. QR code 10 of FIG. 1A was printed on a printing paper by the home printer. Moreover, as shown in FIG. 1B, a pattern 100 of FIG. 1A was printed on the QR code 10 by using the quantum dot oil-based ink having n-octane (i.e., the dispersing solvent) and 1-octadecene (i.e., the viscosity modifier). No patterns could be observed when observing the QR code 10 of FIG. 1B under visible light, representing that the quantum dot oil-based ink was transparent and colorless under visible light.

Figure 1C:
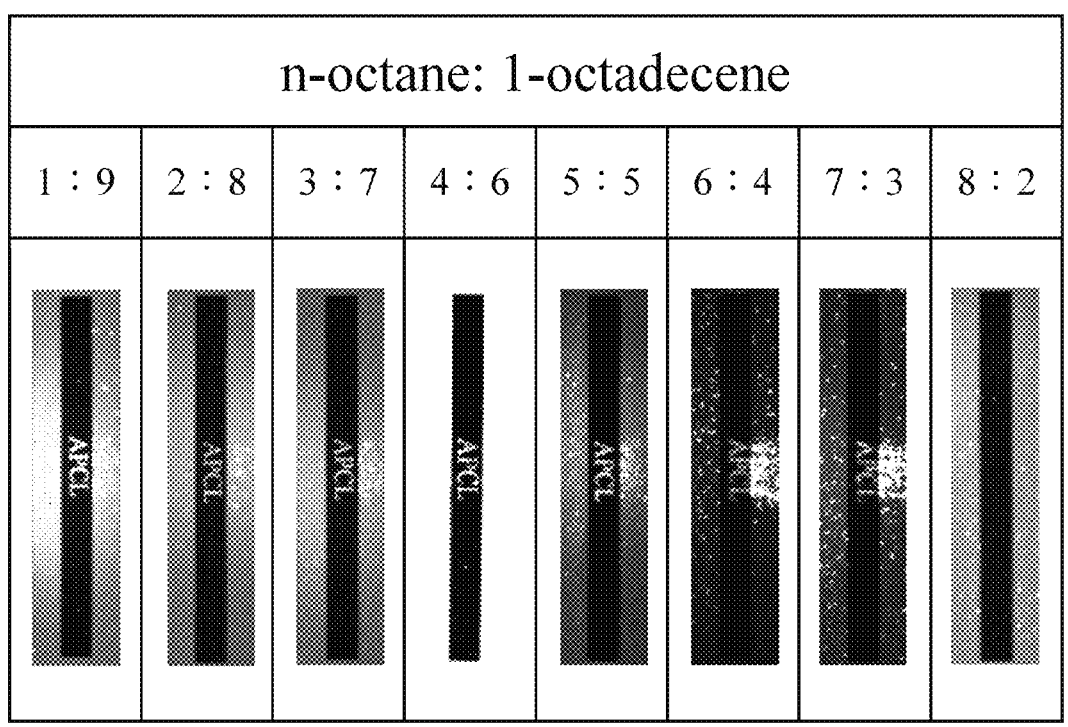
FIG. 1C illustrates post ink-jet printing patterns captured by an infrared camera, in which the patterns are ink-jet printed by quantum dot oil-based ink with different proportions of the dispersing solvent and the viscosity modifier.

Then, referring to FIG. 1C, FIG. 1C illustrates post ink-jet printing patterns captured by an infrared camera, in which the patterns were in Region R of FIG. 1B. Specifically, in FIG. 1C, quantum dot oil-based inks prepared from n-octane and 1-octadecene in different volume ratios were used in ink-jet printing of the pattern. Besides, the quantum dot oil-based ink was prepared under the condition of Example 2. Then, a light with a wavelength of 440 nm was used to irradiate QR code 10 shown in FIG. 1A and FIG. 1B, and the printing effect of the pattern was captured by an infrared camera capable of detecting near infrared light. As shown in FIG. 1C, when the volume ratio of the n-octane to the 1-octadecene in the quantum dot oil-based ink was 1:9, the pattern on the QR code was the clearest. As the volume ratio of the n-octane to the 1-octadecene gradually increased, the pattern on the QR code became blurry gradually. When the volume ratio of the n-octane to the 1-octadecene in the quantum dot oil-based ink was 8:2, the pattern on the QR code was unrecognizable, because the volume ratio of n-octane to 1-octadecene was too large that causes the ink-jet to be too fast and too much, and thereby causing the ink to bounce back to the printer head and form ink droplets to clog the printer head. Not only that, too fast and too much ink-jet may also cause burrs or random dots in the printed pattern (for example, when the volume ratio of the n-octane to the 1-octadecene in the quantum dot oil-based ink was between 6:4 and 8:2, white dots may appear around the printed pattern), and thereby forming a blurry pattern.

4. Surface Tension Test of the Quantum Dot Oil-Based Ink

Under a condition similar to Example 2, whereas the volume ratio of the n-octane to the 1-octadecene was adjusted to 4:6 and polyethylene with different amount was further added to the quantum dot oil-based ink to adjust the surface tension of the quantum dot oil-based ink. In detail, polyethylene was dissolved in 5 mL toluene, and the toluene solution having polyethylene (i.e., the surface tension modifying solution described above) was uniformly mixed with the quantum dot oil-based ink of Example 2 (wherein the volume ratio of the n-octane to the 1-octadecene was 4:6). After mixing, the total volume of the quantum dot oil-based ink was 5 mL, and the final volume ratio of the n-octane to 1-octadecene to toluene was 4:6:0.5. However, for the purpose of comparing the difference with and without the addition of the polyethylene, in some samples, polyethylene was not added or the solvent of the quantum dot oil-based ink was completely replaced with water, 1-octadecene, or toluene, for performing the surface tension test of the quantum dot oil-based ink.

Specifically, in accordance with Wilhelmy plate method, a tensiometer may be used to measure the surface tension of the sample quantum dot oil-based ink. In detail, a surface tensiometer (model number CBVP-Z, Kyowa Interface Science) was adopted to perform the measurement, wherein the solution was added to a vessel to let the surface tensiometer automatically measure the value of the surface tension and recorded the value. The influence of the surface tension modifying solution on the surface tension of the quantum dot oil-based ink is shown in Table 2.

TABLE 2

| dispersing solvent, viscosity modifier, and/or surface tension modifying solution | | viscosity (mPa · s) | surface tension (dyne/cm) |
| --- | --- | --- | --- |
| water | | 1 | 72 |
| 1-octadecene | | 4.329 | 25.94 |
| n-octane | | 0.573 | 20.86 |
| toluene | | 0.646 | 28.55 |
| n-octane/1-octadecene (4:6) | | 1.725 | 22.97 |
| polyethylene (wt %) | 0.025 wt % | 1.607 | 23.09 |
| | 0.05 wt % | 1.605 | 23.21 |
| | 0.075 wt % | 1.656 | 23.46 |
| | 0.1 wt % | 1.692 | 23.46 |
| | 0.125 wt % | 1.723 | 23.46 |

As shown in Table 2, when the surface tension modifying solution was not added at all (i.e., toluene solution having polyethylene), the surface tension of the quantum dot oil-based ink was the smallest. As the amount of the added polyethylene increased, the surface tension of the quantum dot oil-based ink gradually increased. When the amount of the polyethylene was 0.075 wt % or above 0.075 wt %, the surface tension of the quantum dot oil-based ink may tend to be a stable value. Based on this result, it was known that adding appropriate amount of polyethylene to the quantum dot oil-based ink can adjust the surface tension of the quantum dot oil-based ink within a desired range.

5. Influence of the Surface Tension of the Quantum Dot Oil-Based Ink on the Effect of the Printed Pattern.

Figure 2A:
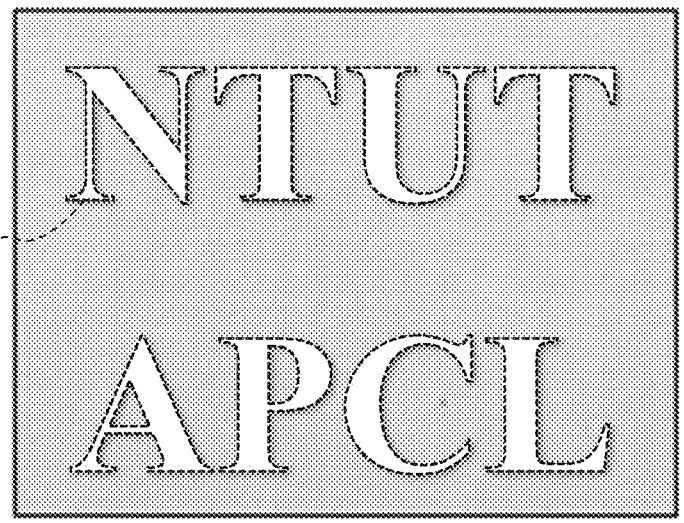
FIG. 2A illustrates a pattern to be ink-jet printed on a printing paper.
Figure 2B:
FIG. 2B illustrates a diagrammatic view of the printing paper after ink-jet printing under visible light.

Referring to FIG. 2A and FIG. 2B, FIG. 2A illustrates a pattern 200 to be ink-jet printed on the printing paper 20 and FIG. 2B illustrates a diagrammatic view of the printing paper after ink-jet printing under visible light. In detail, the pattern 200 shown in FIG. 2B was printed on a printing paper by a home printer. Furthermore, as shown in FIG. 2B, pattern 200 as shown in FIG. 2A was printed on the printing paper by using the quantum dot oil-based ink added of n-octane (i.e., dispersing solvent), 1-octadecene (i.e., viscosity modifier) and polyethylene (i.e., the hydrophobic polymer of the surface tension modifying solution). No patterns could be observed when observing the pattern of FIG. 2B under visible light, representing that the quantum dot oil-based ink was transparent and colorless under the visible light.

Then, referring to FIG. 2C, FIG. 2C illustrates post ink-jet printing patterns captured by an infrared camera. A quantum dot oil-based ink prepared by different amount of polyethylene was used to ink-jet print the patterns. Besides, the quantum dot oil-based ink was prepared under the condition of Example 4. That is, the volume ratio of n-octane to 1-octadecene to toluene of the quantum dot oil-based ink was 4:6:0.5. Then, a light with a wavelength of 440 nm irradiates the printing paper 20 shown in FIG. 2A and FIG. 2B, and the printing effect of the pattern was captured by an infrared camera capable of detecting near infrared light. As shown in FIG. 2C, when the amount of the polyethylene in the quantum dot oil-based ink was 0.025 wt %, the printed pattern on the paper was blurrier. As the amount of the polyethylene in the quantum dot oil-based ink increased, the pattern gradually became clearer. However, there were no significant differences on pattern printing effect when adding 0.075 wt %, 0.1 wt % and 0.125 wt % polyethylene, because the quantum dot oil-based ink added these amounts of polyethylene both had the same value of surface tension (referring to the Table 2 of Example 4).

Although some embodiments of the disclosure and their advantages have been described in detail, it should be understood that various changes, substitutions and alterations can be made herein without departing from the spirit and scope of the disclosure. Thus, the scope of the present disclosure shall be defined by the appended claims.

What is claimed is:

1. A quantum dot oil-based ink, comprising:
   a quantum dot material;
   a dispersing solvent comprising a linear alkane having 6 to 14 carbon atoms and configured to disperse the quantum dot material in the quantum dot oil-based ink;
   a viscosity modifier comprising an aromatic hydrocarbon having 10 to 18 carbon atoms or a linear olefin having 16 to 20 carbon atoms, wherein a viscosity of the quantum dot oil-based ink is controlled by adjusting a volume ratio of the dispersing solvent to the viscosity modifier; and
   a surface tension modifying solution comprising a hydrophobic polymer material and a nonpolar solvent and configured to adjust a surface tension of the quantum dot oil-based ink,
   wherein the viscosity of the quantum dot oil-based ink is between 0.5 mPa·s and 5.0 mPa's, and the surface tension of the quantum dot oil-based ink is between 20 dyne/cm and 30 dyne/cm.

2. The quantum dot oil-based ink of claim 1, wherein the quantum dot material comprises near infrared quantum dots.

3. The quantum dot oil-based ink of claim 1, wherein an amount of the viscosity modifier is between 0.1 wt % and 10 wt %.

4. The quantum dot oil-based ink of claim 1, wherein a viscosity of the viscosity modifier is between 3 mPa's and 5 mPa·s.

5. The quantum dot oil-based ink of claim 1, wherein the volume ratio of the dispersing solvent to the viscosity modifier is between 1:9 and 7:3.

6. The quantum dot oil-based ink of claim 1, wherein an amount of the hydrophobic polymer material is between 0.005 wt % and 0.5 wt %.

7. The quantum dot oil-based ink of claim 1, wherein the hydrophobic polymer material is a hydrophobic organic polymer material comprising polyethylene, polystyrene, polypropylene, poly(methyl methacrylate) (PMMA), poly(ethylene glycol) monolaurate, polyacrylate, or a combination thereof.

8. The quantum dot oil-based ink of claim 1, wherein the nonpolar solvent of the surface tension modifying solution comprises an aromatic hydrocarbon, and wherein a volume ratio of the dispersing solvent to the nonpolar solvent is between 8:1 and 8:4.

9. A pattern recognition system, comprising:
   an object to be detected, wherein a surface of the object is coated with a pattern having the quantum dot oil-based ink of claim 1;
   an excitation light source configured to irradiate the pattern on the object, wherein the excitation light source emits a blue light or an ultraviolet light; and
   an infrared light detector configured to detect an emission light generated by the pattern of the quantum dot oil-based ink, wherein the emission light has a wavelength within a near infrared range,
   wherein the viscosity of the quantum dot oil-based ink is between 0.5 mPa·s and 5.0 mPa's, and the surface tension of the quantum dot oil-based ink is between 20 dyne/cm and 30 dyne/cm.

10. The pattern recognition system of claim 9, wherein the quantum dot material comprises near infrared quantum dots.

11. The pattern recognition system of claim 9, wherein an amount of the viscosity modifier is between 0.1 wt % and 10 wt %.

12. The pattern recognition system of claim 9, wherein a viscosity of the viscosity modifier is between 3 mPa's and 5 mPa·s.

13. The pattern recognition system of claim 9, wherein the volume ratio of the dispersing solvent to the viscosity modifier is between 1:9 and 7:3.

14. The pattern recognition system of claim 9, wherein an amount of the hydrophobic polymer material is between 0.005 wt % and 0.5 wt %.

15. The pattern recognition system of claim 9, wherein the hydrophobic polymer material is a hydrophobic organic polymer material comprising polyethylene, polystyrene, polypropylene, poly(methyl methacrylate) (PMMA), poly(ethylene glycol) monolaurate, polyacrylate, or a combination thereof.

16. The pattern recognition system of claim 9, wherein the nonpolar solvent of the surface tension modifying solution comprises an aromatic hydrocarbon, and wherein a volume ratio of the dispersing solvent to the nonpolar solvent is between 8:1 and 8:4.

* * * * *